UNITED STATES PATENT OFFICE.

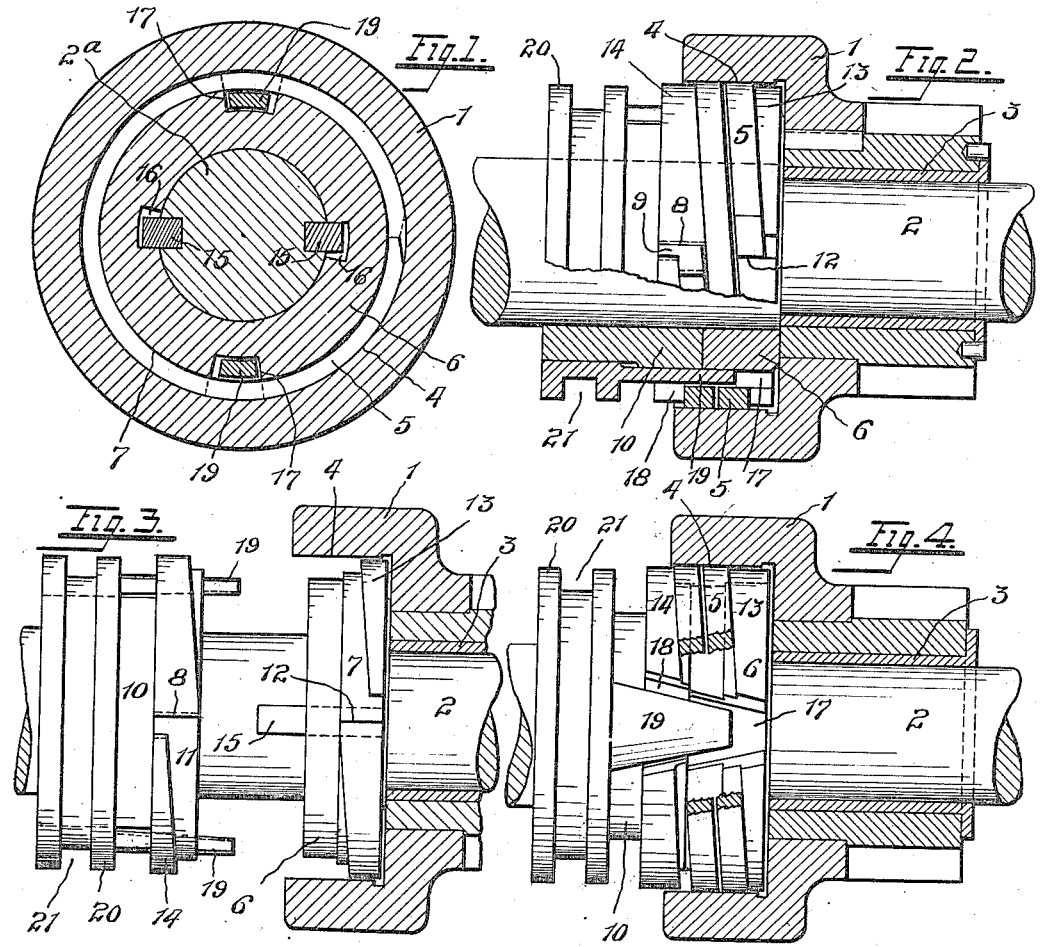
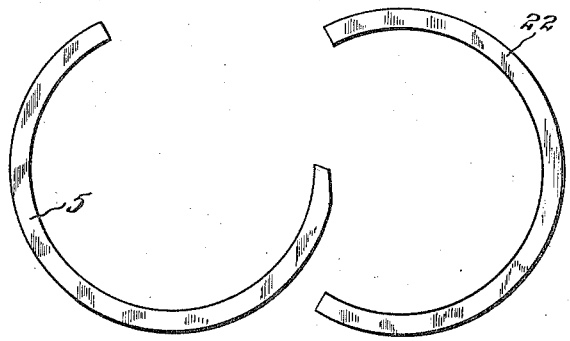
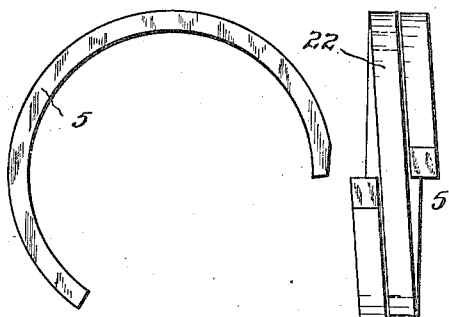

WILLIAM H. WAITE, OF CLEVELAND, OHIO, ASSIGNOR TO THE BROWNING COMPANY, OF CLEVELAND, OHIO, A CORPORATION OF OHIO.

CLUTCH.

1,226,036.  Specification of Letters Patent.  Patented May 15, 1917.

Application filed September 8, 1916. Serial No. 119,108.

*To all whom it may concern:*

Be it known that I, WILLIAM H. WAITE, a citizen of the United States, resident of Cleveland, county of Cuyahoga, and State of Ohio, have invented a new and useful Improvement in Clutches, of which the following is a specification, the principle of the invention being herein explained and the best mode in which I have contemplated applying that principle, so as to distinguish it from other inventions.

My invention relates to friction clutches of the type shown, described and claimed in U. S. Letters Patent No. 683,169, issued September 24, 1901 to V. R. Browning, its principal object being to provide a clutch structure of the above-described character which will permit of the removal or replacement of the helical spring with a minimum of labor and in a minimum of time.

In the above-mentioned patented structure, the helical spring was of unitary construction and the arrangement of parts is such that in order to remove such unitary spring or replace same after having been broken, it was necessary to dismount the entire shaft and disconnect many of the parts therefrom before such removal or replacement could be effected.

The specific object, therefore, of my invention is to permit the use of a clutch having the general construction of such patented device but wherein the spring is so arranged that it may be removed without dismounting the shaft or removing any of the other parts therefrom.

The said invention consists of means hereinafter fully described and particularly set forth in the claims.

The annexed drawing and the following description set forth in detail certain means embodying my invention, the disclosed means, however, constituting but one of various mechanical forms in which the principle of the invention may be applied.

In said annexed drawing:—

Figure 1 represents a cross-section of my improved clutch, showing also a section of the shaft upon which it is mounted.

Fig. 2 represents a partial axial section and elevation, showing a fragmentary section of the shaft.

Fig. 3 represents an elevation of the members of the clutch, showing same separated, but showing the driven member in axial section, the spring being omitted.

Fig. 4 represents an axial section of the driven member taken upon the plane at right angles to the plane of section of Figs. 2 and 3, showing the remaining parts of the clutch in elevation but with portions of the spring broken away to disclose parts beneath same.

Fig. 5 represents an end view of the three segments of the spring.

Fig. 6 represents a front elevation of the spring segments all assembled.

As in the above-mentioned patented structure, the illustrated embodiment of my invention comprises a driven member 1 rotatably mounted upon the shaft 2, a suitable bushing 3 being provided between the driven member and shaft, as shown in Fig. 2. This driven member is formed with an internal cylindrical friction surface 4 which receives directly the frictional contact of the helical spring 5. A sleeve 6 is mounted upon the shaft and normally lies within the driven member 1, as shown in Fig. 3, and this sleeve is formed with a spring seat 7 and a shoulder 12 which receives the thrust of one end of the spring. A second sleeve 10 is also mounted upon the shaft and is formed with a spring seat 11 and a seat 8 which receives the thrust of the other end of the spring. The sleeve 6 is formed with an end flange 13 and the sleeve 10 with an end flange 14, against which the outer sides of the spring lie, as shown in Figs. 2 and 4. These sleeves are both rotatably connected with the shaft by means of splines 15 which extend into slightly elongated grooves 16 in these sleeves, whereby the latter are permitted a limited rotative movement upon the shafts, as in the case of said patented structure. The sleeve 6 is provided with a wedge-shaped recess 17 and the sleeve 10 with a wedge-shaped recess 18 into which projects a wedge 19 forming an integral part of a collar 20. This collar is formed with a groove 21 which is engaged by the members of a shifting lever (not shown), whereby said collar may be shifted while rotating with the shaft, as will be understood. This wedge engages oppositely disposed surfaces upon the collars 6 and 10 respectively, so as to move said collars in opposite directions, and thereby expands the spring so as to cause its outer surface to frictionally engage the friction surface 4, as in the case of said above-named patented device.

However, instead of making the spring of an integral structure as was formerly the case, I cut said spring so as to form a removable segment 22, such segment being of a size such as to divide the spring into parts which will have distances between their free ends sufficient to permit them to be passed onto the shaft in a direction transverse with respect to the axis thereof.

In order to place the spring in position, the sleeve 10 and collar 20, are moved away from the driven member 1, as shown in Fig. 3, whereupon the spring segments may be slipped onto the shaft in the direction indicated, and placed in their proper position upon the spring seat formed by the two sleeves 6 and 10. After having been so placed, sleeve 10 is moved into its proper position abutting the sleeve 6 and thus confining the spring between the two flanges 13 and 14.

Suitable means are provided, as will be readily understood, for retaining the sleeves 6 and 10 in their proper positions. It will thus be seen that while the spring is separated into a multiplicity of parts, it may still perform the same function as a unitary spring and in the same manner, but its removal from or replacement in the clutch is greatly simplified, as will be readily understood.

Inasmuch as it is necessary to adjust the ends of the spring with reference to the parts of the sleeves against which they abut, I provide the seat 8, previously mentioned, for the reception of the removable and replaceable thrust block 9. This seat is beveled or undercut and receives the block which may be slipped into the seat from the side. This block is made of the proper length to give the required adjustment and may be ground to secure such adjustment before placing in its seat. When worn out it may be removed and replaced with a new block.

Having fully described by invention, what I claim and desire to secure by Letters Patent is:—

1. In a friction clutch, the combination of a shaft, a driven member rotatively mounted upon the latter; a spring within said driven member and surrounding said shaft; driving means adapted to expand said spring to engage said driven member; said spring being non-unitary in structure whereby it may be removed from said shaft in a direction transverse with respect to the latter.

2. In a friction clutch, the combination of a shaft; a driven member rotatively mounted upon the latter; a helical spring within said driven member and surrounding said shaft; and driving means adapted to expand said spring to engage said driven member; said spring having a removable segment, whereby it may be assembled on said shaft in a direction transverse with respect to the latter's axis.

3. In a friction clutch comprising a shaft and driving and driven members, a spring consisting of a multiplicity of parts separable from each other, said parts being mounted in juxtaposition and engaging each other so that they coact to perform the function of a single spring, each such part being capable of being removed from the shaft without dismounting the latter or removing any of said members therefrom.

Signed by me, this 29th day of August, 1916.

WILLIAM H. WAITE.